United States Patent
Ueda et al.

(10) Patent No.: US 6,683,672 B2
(45) Date of Patent: Jan. 27, 2004

(54) LIQUID CRYSTAL COMPOSITION AND REFLECTIVE TYPE LIQUID CRYSTAL DISPLAY

(75) Inventors: Hideaki Ueda, Kishiwada (JP); Takeshi Kitahora, Osaka (JP); Fumie Motoori, Osaka (JP)

(73) Assignee: Minolta Co., Ltd., Osaka (JP)

(*) Notice: Subject to any disclaimer, the term of this patent is extended or adjusted under 35 U.S.C. 154(b) by 48 days.

(21) Appl. No.: 10/154,255

(22) Filed: May 23, 2002

(65) Prior Publication Data
US 2002/0196404 A1 Dec. 26, 2002

(30) Foreign Application Priority Data
Jun. 1, 2001 (JP) ......................... 2001-167511

(51) Int. Cl.[7] .................. G02F 1/1335; C09K 19/02
(52) U.S. Cl. .................. 349/176; 349/172; 349/106
(58) Field of Search .................. 349/171, 172, 349/184–186, 104, 106, 110, 176

(56) References Cited

U.S. PATENT DOCUMENTS

| 4,278,328 | A | | 7/1981 | Mukoh et al. ............... 350/349 |
| 6,549,261 | B1 | * | 4/2003 | Okada et al. ............... 349/176 |
| 6,602,563 | B2 | * | 8/2003 | Kobayashi et al. ........... 428/1.3 |
| 2002/0039167 | A1 | * | 4/2002 | Kitahora et al. ............. 349/186 |
| 2002/0171789 | A1 | * | 11/2002 | Ueda et al. ................. 349/106 |

FOREIGN PATENT DOCUMENTS

| JP | 11-323337 A | 11/1999 |
| JP | 2000-129261 A | 5/2000 |
| JP | 2000-178557 A | 6/2000 |
| JP | 2000-178558 A | 6/2000 |
| JP | 2001-147421 A | 5/2001 |
| JP | 2002-012865 A | 1/2002 |

OTHER PUBLICATIONS

U.S. patent application Ser. No. 09/718,138, Iwamatsu et al., filed Nov. 21, 2000.

* cited by examiner

*Primary Examiner*—Dung Nguyen
(74) *Attorney, Agent, or Firm*—Sidley Austin Brown & Wood LLP

(57) ABSTRACT

A chiral nematic liquid crystal composition which contains a nematic liquid crystal mixture and a chiral agent, which exhibits a cholesteric phase at room temperature and which selectively reflects light of a specified wavelength, wherein the chiral agent has an anisotropy of dielectric constant within a range from 12 to 60. Such a chiral nematic liquid crystal composition may have a larger anisotropy of dielectric constant than the nematic liquid crystal mixture before being mixed with the chiral agent. Alternatively, in such a chiral nematic liquid crystal composition, the anisotropy of dielectric constant of the chiral agent may be larger than that of the nematic liquid crystal mixture. By filling such a chiral nematic liquid crystal composition between transparent substrates, a liquid crystal cell is fabricated, and by stacking such liquid crystal cells in three layers, a reflective type full-color liquid crystal display can be produced.

52 Claims, 6 Drawing Sheets

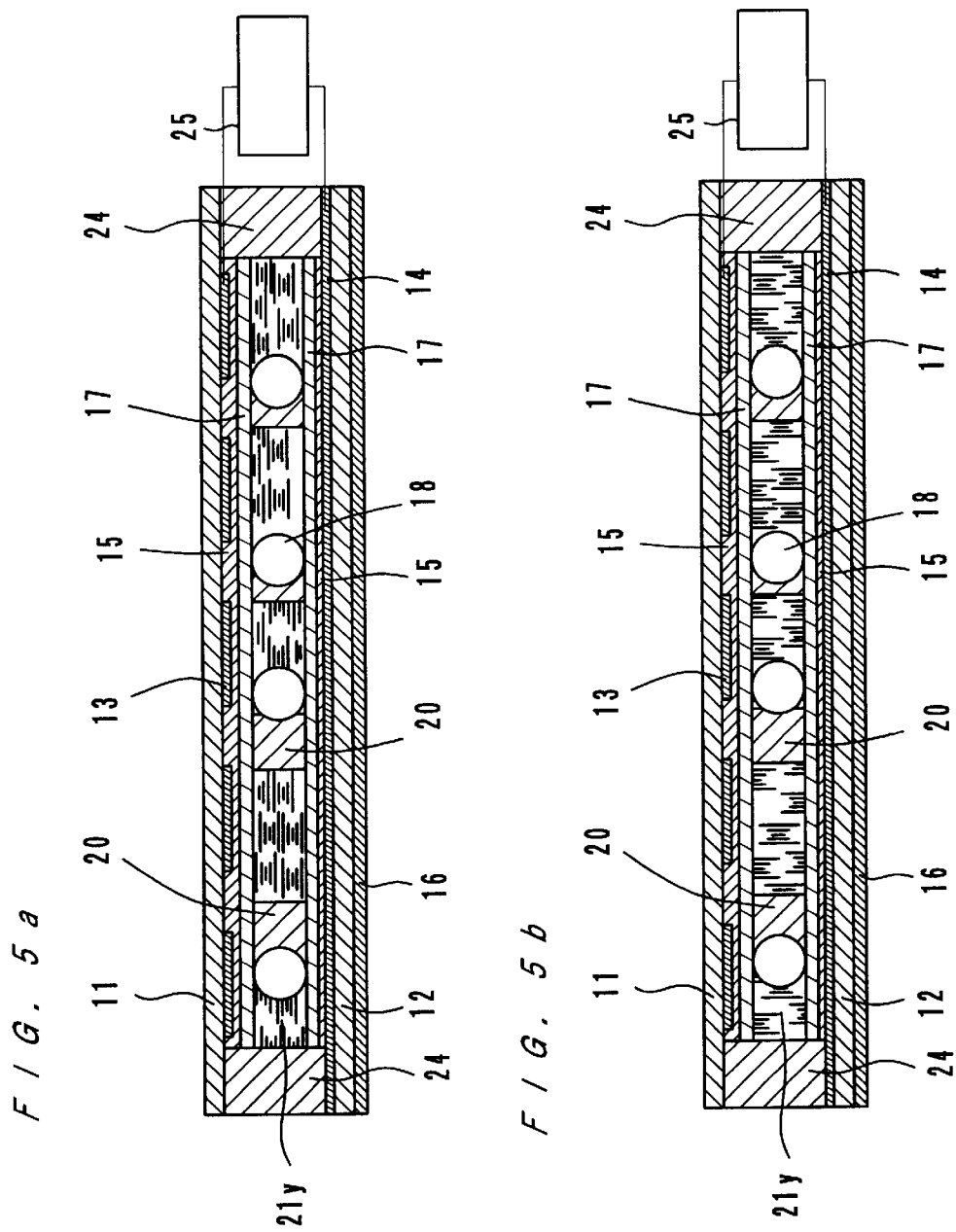

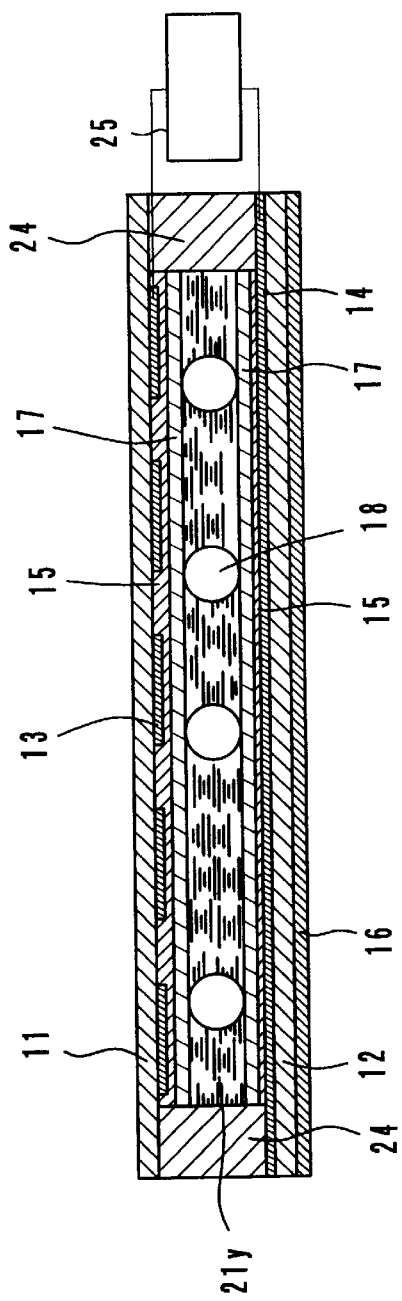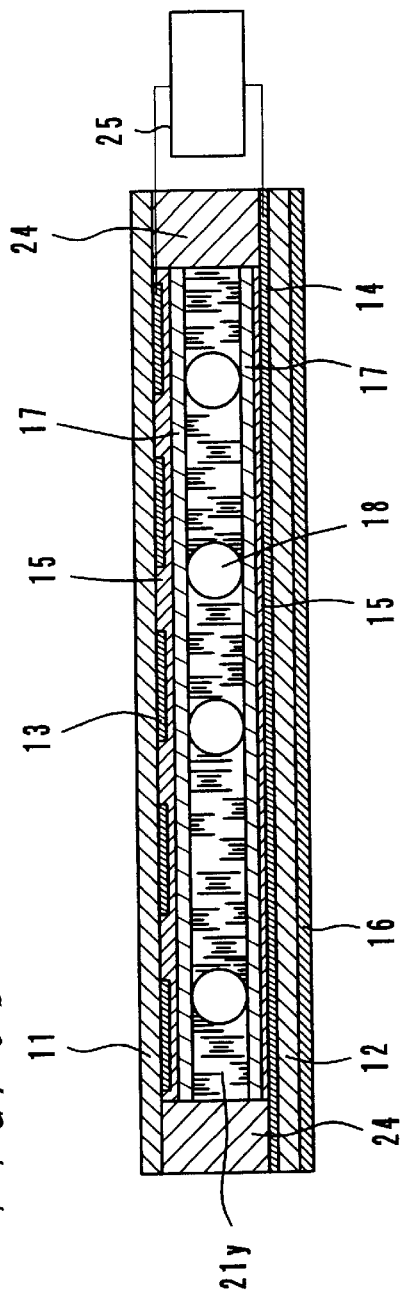

LIQUID CRYSTAL COMPOSITION AND REFLECTIVE TYPE LIQUID CRYSTAL DISPLAY

This application is based on Japanese Patent Application No. 2001-167511, of which content is incorporated by reference.

BACKGROUND OF THE INVENTION

1. Field of the Invention

The present invention relates to a liquid crystal composition and a reflective type liquid crystal display which uses the liquid crystal composition.

2. Description of Related Art

A liquid crystal display generally comprises a pair of substrates with transparent electrodes thereon and a liquid crystal layer filled between the pair of substrates. By applying a driving voltage to the liquid crystal, the alignment of the liquid crystal molecules is controlled so as to modulate external light which is incident to the display, and thereby, a desired image can be displayed.

Various methods of writing an image on liquid crystal have been suggested. In recent years, various kinds of liquid crystal displays which use chiral nematic liquid crystal compositions have been studied, the chiral nematic liquid crystal compositions being produced by adding chiral agents to nematic liquid crystal and exhibiting a cholesteric phase at room temperature.

Such a liquid crystal display is known, for example, as a reflective type liquid crystal display which uses selective reflection of the liquid crystal at the cholesteric phase and which accordingly has an advantage of consuming little electric power. In such a reflective type liquid crystal display, pulse voltages with high energy and with low energy are selectively applied to the liquid crystal, and thereby, the liquid crystal is switched between a planar state (colored state) and a focal-conic state (transparent state). In this way, an image is written on the display. Then, after the application of the pulse voltage is stopped, the liquid crystal stays in the planar state, the focal-conic state or an intermediate state therebetween. (This characteristic of the liquid crystal of staying in the planar state or in the focal-conic state is generally referred to as bistability or memory effect). Thus, the image written on the display can be continuously displayed even after stoppage of the voltage application.

Also, in order to permit full-color display, it is possible to structure such a liquid crystal display into a three-layered display composed of an R liquid crystal layer for display of red, a G liquid crystal layer for display of green and a B liquid crystal layer for display of blue.

Such reflective type liquid crystal displays which use chiral nematic liquid crystal, however, have a demerit that because high driving voltages are necessary to drive these displays, inexpensive ICs for general purpose cannot be used. The reason is described. Chiral agents of which anisotropy of dielectric constant is small, that is, not more than 10 have been used for chiral nematic liquid crystal. When such a chiral agent with a small anisotropy of dielectric constant is added to nematic liquid crystal so as to produce a chiral nematic liquid crystal composition which exhibits a cholesteric phase at room temperature, the anisotropy of dielectric constant of the chiral nematic liquid crystal composition is too small, and it follows that a high voltage is necessary to drive the chiral nematic liquid crystal composition.

SUMMARY OF THE INVENTION

An object of the present invention is to provide a liquid crystal composition and a reflective type liquid crystal display which require low driving voltages and which can use inexpensive ICs for general purpose.

The inventors had been studied so as to achieve the object, and they found that by adding a chiral agent with a relatively high anisotropy of dielectric constant to a nematic liquid crystal mixture, the obtained chiral nematic liquid crystal composition has a higher anisotropy of dielectric constant than that of the nematic liquid crystal mixture or has such an anisotropy of dielectric constant as to permit a drive of the chiral nematic liquid crystal composition by application of a low voltage.

A liquid crystal composition according to the first aspect of the present invention is a chiral nematic liquid crystal composition which contains a nematic liquid crystal mixture and a chiral agent, which exhibits a cholesteric phase at room temperature and which selectively reflects light of a specified wavelength, and the anisotropy of the dielectric constant of the chiral nematic liquid crystal composition is larger than that of the nematic liquid crystal mixture before being mixed with the chiral agent.

A liquid crystal composition according to the second aspect of the present invention is a chiral nematic liquid crystal composition which contains a nematic liquid crystal mixture and a chiral agent, which exhibits a cholesteric phase at room temperature and which selectively reflects light of a specified wavelength, and the anisotropy of dielectric constant of the chiral agent is within a range from 12 to 60.

A liquid crystal composition according to the third aspect of the present invention is a chiral nematic liquid crystal composition which contains a nematic liquid crystal mixture and a chiral agent, which exhibits a cholesteric phase at room temperature and which selectively reflects light of a specified wavelength, and the anisotropy of dielectric constant of the chiral agent is larger than that of the nematic liquid crystal mixture.

According to the first, the second and the third aspect of the present inventions, by adding a chiral agent with a relatively high anisotropy of dielectric constant to a nematic liquid crystal mixture, the anisotropy of dielectric constant of the obtained chiral nematic liquid crystal composition is larger than that of the nematic liquid crystal mixture, and thereby only a low driving voltage is necessary, or the anisotropy of dielectric constant of the obtained chiral nematic liquid crystal composition is large enough to necessitate only a low driving voltage. The necessity of only a low driving voltage permits use of inexpensive ICs, which results in a reduction in cost of a liquid crystal display.

The chiral agent to be added preferably has an anisotropy of dielectric constant within a range from 12 to 60. If the anisotropy of dielectric constant of the chiral agent is lower than 12, the effect of reducing the driving voltage is weak. On the other hand, if the anisotropy of dielectric constant of the chiral agent is larger than 60, the stability of the chiral agent is low, and there may be cased problems that the reliability of the liquid crystal display is not good and that the parts and members provided around the liquid crystal layer are dissolved.

In preparing a chiral nematic liquid crystal composition, if a nematic liquid crystal mixture is mixed with a chiral agent with a higher anisotropy of dielectric constant than the nematic liquid crystal mixture, the obtained chiral nematic liquid crystal composition will never has a lower anisotropy of dielectric constant than the nematic liquid crystal mixture. Thus, the problem that a high driving voltage becomes necessary due to addition of a chiral agent can be avoided.

A chiral nematic liquid crystal composition has a merit that the wavelength of light to be selectively reflected by the liquid crystal composition can be controlled by changing the content of the chiral agent therein. The content of the chiral agent is preferably within a range from 8 wt % to 45 wt % of the total of the nematic liquid crystal mixture and the chiral agent. If the content of the chiral agent is lower than 8 wt %, the chiral nematic liquid crystal composition may not be able to have a sufficient memory effect. On the other hand, if the content of the chiral agent is larger than 45 wt %, the chiral nematic liquid crystal composition may not exhibit a cholesteric phase at room temperature and/or may be solidified.

In the meantime, the anisotropy of dielectric constant of the chiral nematic liquid crystal composition is preferably within a range from 8 to 45. If it is smaller than 8, a high driving voltage will be necessary. On the other hand, if it is larger than 45, the reliability of the liquid crystal display will be worse.

Also, if such a chiral nematic liquid crystal composition contains two or more kinds of chiral agents, shifts of the wavelength of light selectively reflected by the chiral nematic liquid crystal composition due to changes in temperature can be adjusted, and the chiral nematic liquid crystal composition will have a stable temperature characteristic. Further, by adding a dye, the color purity of the wavelength of the reflection peak can be improved. Various kinds of well known dyes can be added, and dyes which are compatible with the liquid crystal composition are suited. For example, azo compounds, quinone compounds, anthraquinone compounds, etc. and dychroic dyes are usable, and combinations of such compounds can be also used. The content of the dye is preferably not more than 3 wt % of the total of the nematic liquid crystal mixture and the chiral agent. If the content of the dye is too large, the performance of selective reflection of the liquid crystal composition will be low, and the contrast will be low.

A reflective type liquid crystal display according to the fourth aspect of the present invention comprises, between a pair of substrate, at least one of which is transparent, a chiral nematic liquid crystal composition which contains a nematic liquid crystal mixture and a chiral agent, which exhibits a cholesteric phase and which selectively reflects light of a specified wavelength, and the anisotropy of dielectric constant of the chiral nematic liquid crystal composition is larger than that of the nematic liquid crystal mixture before being mixed with the chiral agent.

A reflective type liquid crystal display according to the fifth aspect of the present invention comprises, between a pair of substrate, at least one of which is transparent, a chiral nematic liquid crystal composition which contains a nematic liquid crystal mixture and a chiral agent, which exhibits a cholesteric phase and which selectively reflects light of a specified wavelength, and the chiral agent contained in the chiral nematic liquid crystal composition has an anisotropy of dielectric constant within a range from 12 to 60.

A reflective type liquid crystal display according to the sixth aspect of the present invention comprises, between a pair of substrate, at least one of which is transparent, a chiral nematic liquid crystal composition which contains a nematic liquid crystal mixture and a chiral agent, which exhibits a cholesteric phase and which selectively reflects light of a specified wavelength, and the chiral agent contained in the chiral nematic liquid crystal composition has a larger anisotropy of dielectric constant than the nematic liquid crystal mixture.

In each of the reflective type liquid crystal displays according to the fourth, the fifth and the sixth aspect of the present inventions, the anisotropy of dielectric constant of the chiral nematic liquid crystal composition is relatively large, and only a low voltage is necessary to drive the liquid crystal composition. Thereby, these liquid crystal displays can be produced at low cost.

Also, by using resin substrates, the liquid crystal displays will have merits of being light and thin and of being not fragile. Further, by providing spacers which are inorganic particles coated with adhesive resin, the gap between the substrates can be maintained evenly, and moreover, because the spacers are adhesive, a problem of display unevenness caused by movements of the spacers can be prevented.

It is preferred that the thickness of the liquid crystal composition between the substrates is within a range from 3 $\mu$m to 10 $\mu$m. If the thickness is less than 3 $\mu$m, the reflection is low, and it is impossible to achieve a satisfactory display performance of a colored state. On the other hand, if the thickness is more than 10 $\mu$m, a high driving voltage is necessary. Also, in this case, because the display performance of black is bad, the contrast is low.

Furthermore, by providing a plurality of polymer nodules between the substrates, it becomes possible to fabricate a large-scale liquid crystal panel. Also, due to these polymer nodules, the accuracy of the thickness of the gap between the substrates and the strength can be heightened. Further, the memory effect of the liquid crystal display can be improved.

Also, it is possible to provide a color filter instead of or in addition to adding a dye to the liquid crystal composition. For example, it is possible to provide a filter layer in the liquid crystal display. The material of the filter layer may be, for example, a material which is prepared by adding a coloring agent to a transparent substance or a material which is essentially colored. For example, the filter layer may be a thin film which is made of a specified substance which functions as a dye. The transparent substrate which is an element of the liquid crystal display can be replaced with such a filter material so that the same effect can be obtained.

BRIEF DESCRIPTION OF THE DRAWINGS

This and other objects and features of the present invention will be apparent from the following description with reference to the accompanying drawings:

FIGS. 5a and 5b are sectional views of a liquid crystal display which is a fourth embodiment of the present invention, FIG. 5a showing a planar state caused by application of a high voltage pulse and FIG. 5b showing a focal-conic state caused by application of a low voltage pulse; and FIGS. 6a and 6b are sectional views of a liquid crystal display which is a fifth embodiment of the present invention, FIG. 6a showing a planar state caused by application of a high voltage pulse and FIG. 6b showing a focal-conic state caused by application of a low voltage pulse.

DETAILED DESCRIPTION OF THE PREFERRED EMBODIMENTS

In the following, some embodiments of a reflective type liquid crystal display according to the present invention will be described with reference to the accompanying drawings, and specific examples of liquid crystal compositions according to the present invention will be given.

First Embodiment; See FIGS. 1 and 2

Figure 1:
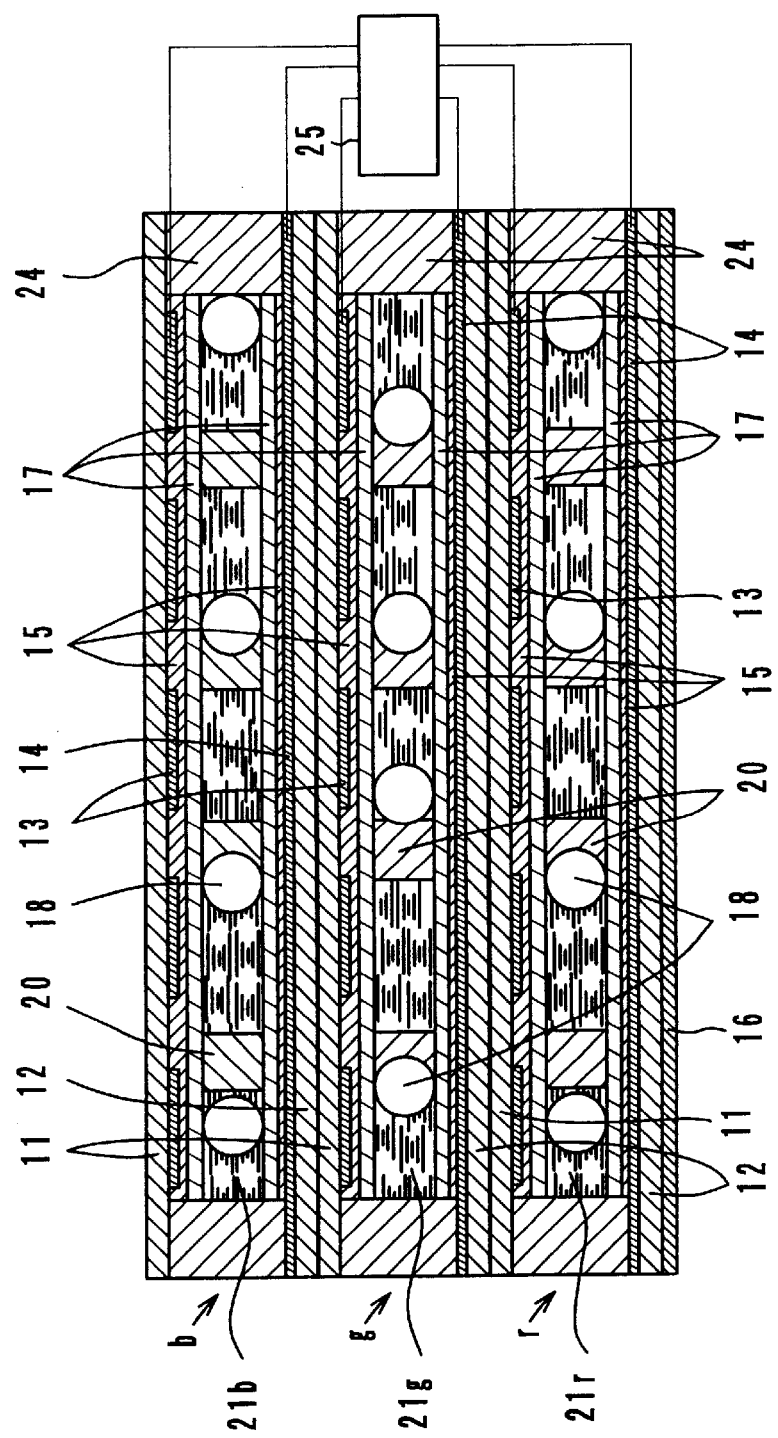
FIG. 1 is a sectional view of a liquid crystal display which is a first embodiment of the present invention, showing a planar state caused by application of a high voltage pulse.
Figure 2:
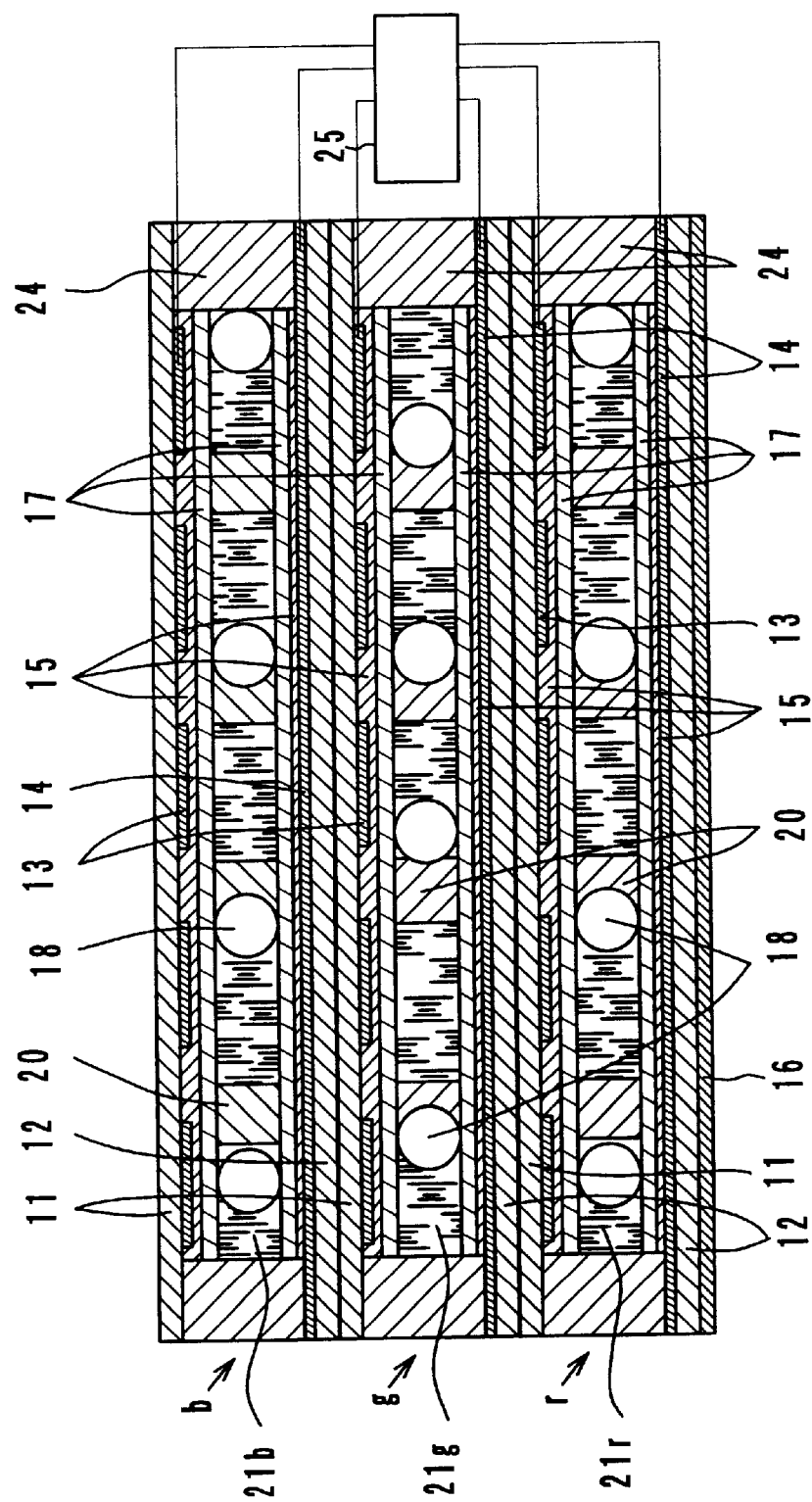
FIG. 2 is a sectional view of the liquid crystal display which is a first embodiment of the present invention, showing a focal-conic state caused by application of a low voltage pulse.

FIGS. 1 and 2 are cross sectional views of a liquid crystal display which is a first embodiment of the present invention. FIG. 1 shows a planar state (colored state in red, green and blue) of the liquid crystal which is caused by application of high-voltage pulses to the liquid crystal, and FIG. 2 shows a focal-conic state (transparent/black state) of the liquid crystal which is caused by application of low-voltage pulses to the liquid crystal. This liquid crystal display has a memory effect, and the liquid crystal stays in the planar state or in the focal-conic state after stoppage of the voltage application.

The liquid crystal display of the first embodiment comprises three liquid crystal layers, namely, a liquid crystal layer r (red display layer), a liquid crystal layer g (green display layer) and a liquid crystal layer b (blue display layer) which comprise liquid crystal compositions $21r$, $21g$ and $21b$, respectively. These three liquid crystal layers r, g and b are piled up in this order.

In the liquid crystal display shown by FIGS. 1 and 2, each of the liquid crystal layers r, g and b has a pair of substrates 11 and 12, and electrodes 13 and 14 are formed on the substrates 11 and 12, respectively.

In each of the liquid crystal layers r, g and b, the reference numerals 11 and 12 denote light-transmitting and transparent substrates, and on these transparent substrates 11 and 12, strip-like transparent electrodes 13 and 14 are formed, respectively. The strip-like transparent electrodes 13 are formed in parallel to each other, and the strip-like transparent electrodes 14 are formed in parallel to each other. The strip-like electrodes 13 and the strip-like electrodes 14 face and cross each other viewed from the vertical direction to the substrates 11 and 12. Preferably, insulating layers and aligning layers are coated on the electrodes 13 and 14. In the first embodiment, insulating layers 15 and aligning layers 17 are coated on the electrodes 13 and 14. Also, a light absorbing layer is provided on the outer side of the substrate which is located opposite the substrate through which light is incident to the liquid crystal display (on the backside of the liquid crystal display), if necessary. In the first embodiment, a light absorbing layer 16 is provided on the backside of the substrate 12 of the red display layer r.

The reference numeral 20 denotes polymer nodules for keeping spaces between the respective pairs of substrates 11 and 12. The reference numerals $21r$, $21g$ and $21b$ denote chiral nematic liquid crystal compositions which exhibit a cholesteric phase at room temperature. The specific examples of the materials of these elements will be given later. The reference numeral 24 denotes a sealant for sealing the liquid crystal compositions $21r$, $21g$ and $21b$ in the respective pairs of substrates 11 and 12.

The reference numeral 25 denotes a pulse power source which applies specified pulse voltages to the electrodes 13 and 14.

Substrates

In this first embodiment, both the substrates 11 and 12 are light transmitting; however, a liquid crystal display according to the present invention requires a pair of substrates at least one of which is light transmitting. For example, glass substrates can be used as the light-transmitting substrates. Also, flexible resin substrates of, for example, polycarbonate, polyether sulfone, polyallylate, polyethylene terephthalate, etc., can be used.

Preferably, the substrate 11 of each of the liquid crystal layers has a color filtering function to cut light which is of shorter wavelengths than the wavelength of light to be selectively reflected by the liquid crystal layer so that the color purity can be improved. For example, the substrate 11 of the liquid crystal layer r preferably functions as a red filter, the substrate 11 of the liquid crystal layer g preferably functions as a yellow filter, and the substrate 11 of the liquid crystal layer b preferably functions as a ultraviolet light cutting filter.

Electrodes

As the electrodes 13 and 14, transparent conductive films of ITO (indium tin oxide), IZO (indium zinc oxide), etc., metal electrodes of aluminum, silicon, etc. and photoconductive films of amorphous silicon, BSO (bismuth silicon oxide), etc. can be used.

In the liquid crystal display shown by FIG. 1, as described above, the strip-like electrodes 13 and 14 are formed on the substrates 11 and 12 respectively in such a way that the electrodes 13 cross the electrodes 14 viewed from the vertical direction to the substrates 11 and 12.

The formation of the parallel strip-like electrodes 13 and 14 on the substrates 11 and 12 can be realized, for example, by mask-depositing an ITO film on the transparent substrates by a sputtering method or by forming an ITO film on the whole surfaces of the transparent substrates and thereafter by patterning the ITO film by a photolithography method.

Insulating Layers

Liquid crystal display according to the present invention, including the liquid crystal display shown by FIGS. 1 and 2 may have insulating layers which prevent short-circuits among the electrodes and which function as gas barrier layers to improve the reliability of the liquid crystal displays. In the first embodiment, as already mentioned, insulating layers 15 are coated on the electrodes 13 and 14.

As the insulating layers 15, for example, inorganic films of silicon oxide, titanium oxide, zirconium oxide, alkoxides of these substances, etc. and organic films of polyimide resin, acrylic resin, urethane resin, etc. can be used.

The insulating layers 15 can be formed of such a material by a conventional method, such as a deposition method, a spin coating method, a roll coating method, etc.

By adding coloring agents to the materials above, insulating layers which also function as color filters can be obtained. Further, the insulating layers can be formed of polymeric resin which is also used as the material of the polymer nodules.

Aligning Layers

For the aligning layers 17, organic materials such as polyimide resin, polyamide imide resin, polyether imide resin, polyvinyl butyral resin, acrylic resin, etc. and inorganic materials such as silicon oxide, aluminum oxide, etc, can be used. The aligning layers 17 made of such a material are not necessarily subjected to a rubbing treatment. The function of the aligning layers 17 may be incorporated in the insulating layers 15.

If a rubbing treatment is carried out on the aligning layers 17, a light rubbing treatment (for example, with a rubbing density of 20 or less) is carried out on only one of the aligning layers 17 which face each other with a liquid crystal composition in-between. With this treatment, the reflectance can be improved. If the aligning layers 17 on both the substrates 11 and 12 are subjected to a rubbing treatment, the memory effect of the liquid crystal may be lost. The rubbing density L is expressed by the following expression:

$$L=N(1+2\pi rm/v)$$

N: number of rubbings
r: radius of a rubbing roller
m: number of revolutions of the rubbing roller
v: relative moving speed of a substrate to the rubbing roller Spacers In liquid crystal displays according to the present invention, including the liquid crystal display shown by FIGS. 1 and 2, spacers may be provided between each pair of substrates so as to keep an even gap between the substrates. In the first embodiment, spacers 18 are provided between the substrates 11 and 12.

The spacers 18 are, for example, resin or inorganic oxide spherical spacers. Also, fixed-type spacers of which surfaces are coated with thermosetting resin are suited to be used as the spacers 18. By using inorganic particles coated with adhesive resin as a space keeping member, the cell gap can be kept constantly. Moreover, since the particles are adhesive, the spacers will not move, and thereby, a problem of display unevenness can be avoided.

As in the first embodiment, both the spacers and the polymer nodules 20 can be provided; it is, however, possible to provide only the spacers 18 as the space keeping member.

Liquid Crystal Composition

Each of the liquid crystal layers is composed of a chiral nematic liquid crystal composition which is prepared by adding a chiral agent to a nematic liquid crystal mixture at a percentage from 8 wt % to 45 wt %, desirably from 10 wt % to 45 wt % and more desirably from 15 wta % to 40 wt %. The percentages of the chiral agent are values when the total of the nematic liquid crystal mixture and the chiral agent is regarded to be 100.

Various kinds of well-known nematic liquid crystal can be used; it is, however, preferable to use the kinds of nematic liquid crystal of which anisotropy of dielectric constant is within a range from 5 to 50. Especially when namtic liquid crystal of which anisotropy of dielectric constant is not less than 20 is used, the selective range of usable chiral agents is wide.

Preferably, the anisotropy of dielectric constant $\Delta\epsilon$ of the chiral nematic liquid crystal composition is within a range from 8 to 45, desirably from 10 to 40 and more desirably from 15 to 30. If the anisotropy of dielectric constant of the chiral nematic liquid crystal composition is too low, a high driving voltage will be necessary. On the other hand, if the anisotropy of dielectric constant of the chiral nematic liquid crystal composition is too high, the stability and the reliability of the liquid crystal display will be bad, and it becomes more likely that image defects and image noise may occur.

By adding a chiral agent of which anisotropy of dielectric constant is relatively high, that is, within a range from 12 to 60 to a nematic liquid crystal mixture, the prepared chiral nematic liquid crystal composition obtains a higher anisotropy of dielectric constant than that of the nematic liquid crystal mixture. Thereby, it becomes possible to drive the chiral nematic liquid crystal composition by application of a low voltage. If a nematic liquid crystal of which anisotropy of dielectric constant is sufficiently high is used, addition of a chiral agent to the nematic liquid crystal mixture may result in a more or less reduction of the anisotropy of dielectric constant of the prepared liquid crystal composition. However, as long as the anisotropy of dielectric constant of the prepared liquid crystal composition is within a range from 8 to 45, it is possible to drive the liquid crystal composition by application of a lower voltage than driving voltages of conventional liquid crystal displays.

The chiral agent preferably has an anisotropy of dielectric constant within a range from 12 to 60, more desirably from 15 to 30 and more desirably from 20 to 30. If the anisotropy of dielectric constant of the chiral agent is lower than 12, the effect of lowering the driving voltage is weak. On the other hand, if the anisotropy of dielectric constant of the chiral agent is higher than 60, the stability of the chiral agent is bad, which results in production of a liquid crystal display with low reliability and an occurrence of a problem that the chiral agent may dissolve the parts and members provided around the liquid crystal layer.

Polymer Nodules

Liquid crystal displays according to the present invention including the liquid crystal display shown by FIGS. 1 and 2 may have polymer nodules between each pair of substrates so as to obtain strength. In the first embodiment, polymer nodules 20 are provided between the substrates 11 and 12.

First, the configuration of the polymer nodules 20 is described. The polymer nodules 20 may be pillars, for example, in the shapes of cylinders, rectangular parallelepipeds, elliptic cylinders, trapezoidal parallelepipeds, circular cones, etc. which are arranged in a regular pattern such as a lattice. Also, the polymer nodules 20 may be walls which are arranged at regular intervals. The arrangement of the pillars or the walls is preferably such a pattern as to keep an appropriate space between the substrates and as not to obstacle display of an image. For example, the pillars or the walls are preferably arranged at uniform intervals, at gradually changing intervals, in periodic patterns, etc. If the area of the polymer nodules between a pair of substrates is within a range from 1% to 40% of the display area, the liquid crystal layer will have strength and a practically satisfactory displaying characteristic.

Next, an exemplary method of forming polyester resin nodules is described. First, on a substrate which has ITO electrodes formed in a specified pattern thereon, a polyester resin solution is printed by use of a printer such as a roll coater, a gravure coater, etc. Thereafter, the solution is dried and hardened.

In order to produce a liquid crystal display, a liquid crystal composition is filled between the substrates which have polymer nodules in-between by a vacuum injection method. Alternatively, in a process of laminating two substrates together, a liquid crystal composition is dropped between the substrates, and the liquid crystal composition is filled and spread between the substrates during the laminating process.

Further, in order to improve the accuracy of the substrate gap control, spacer materials which are smaller than the height of the resin nodules, for example, glass fiber balls, glass balls, ceramic powder or spherical particles of an organic material are arranged between the substrates, and heat and/or pressure are/is applied. Thereby, the gap can be controlled more accuracy, and voltage unevenness and display unevenness can be reduced.

Second Embodiment; See FIGS. 3 and 4

Figure 3:
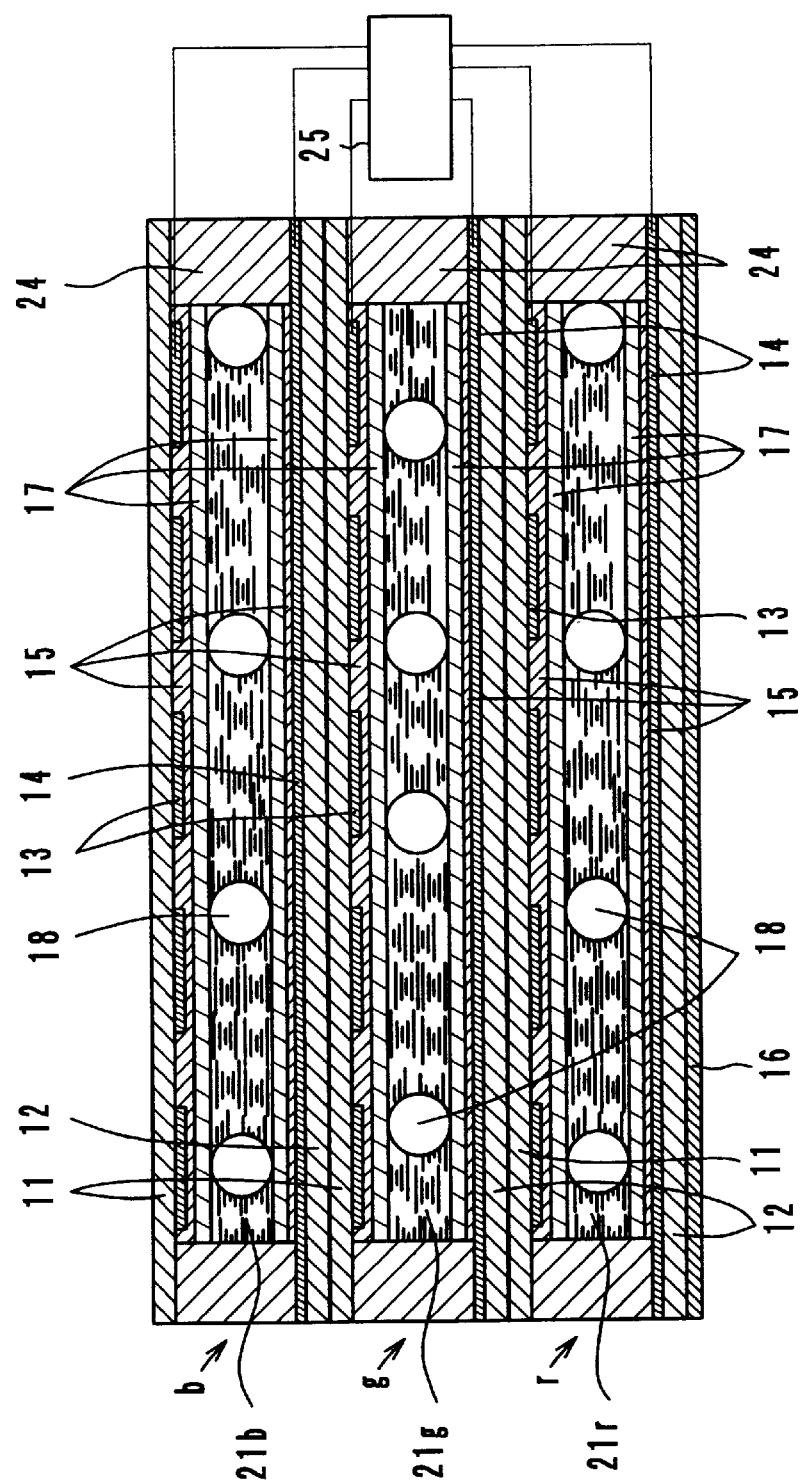
FIG. 3 is a sectional view of a liquid crystal display which is a second embodiment of the present invention, showing a planar state caused by application of a high voltage pulse.
Figure 4:
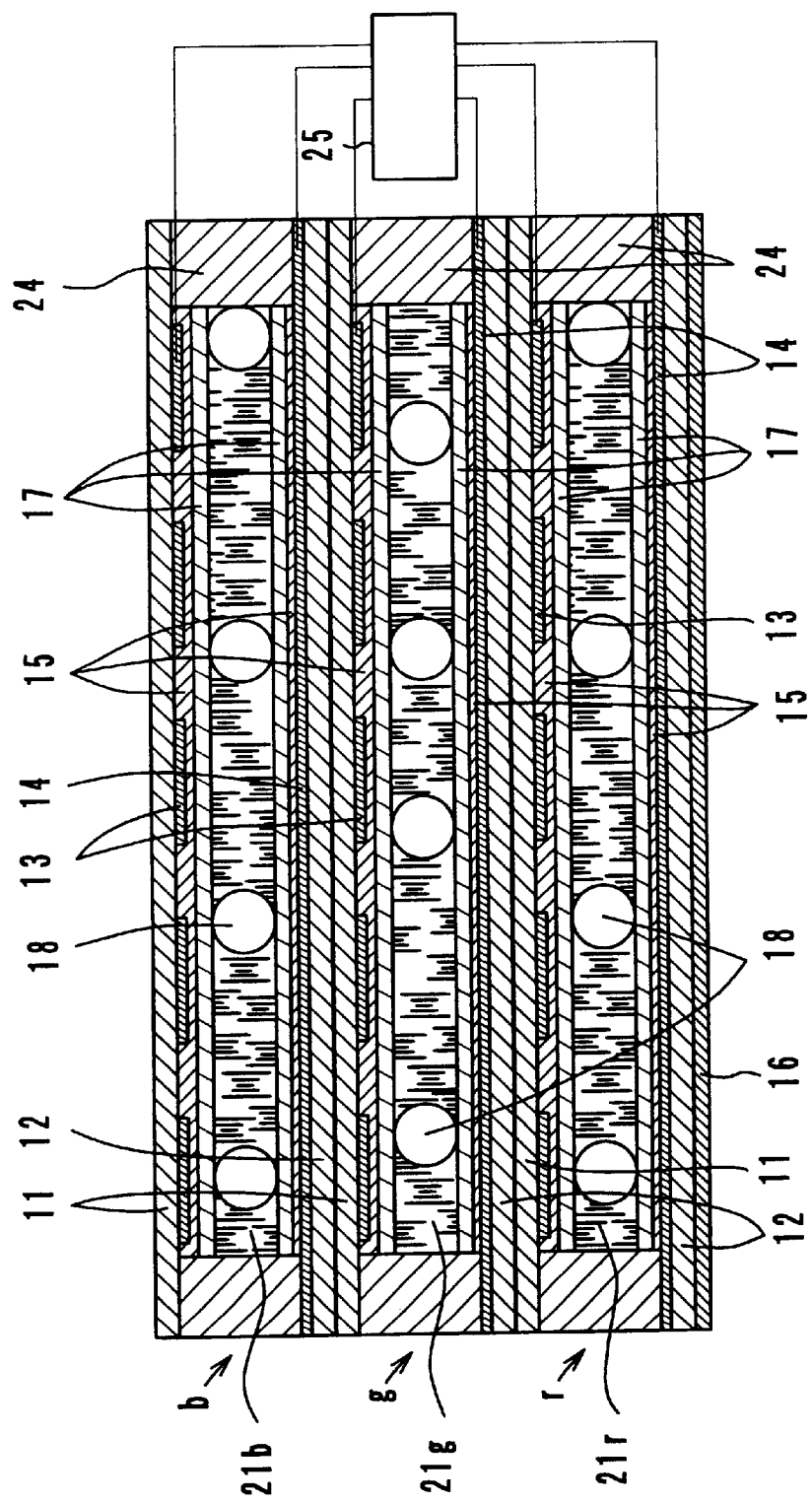
FIG. 4 is a sectional view of the liquid crystal display which is a second embodiment of the present invention, showing a focal-conic state caused by application of a low voltage pulse.

FIGS. 3 and 4 show cross sectional views of a liquid crystal display which is a second embodiment of the present invention. FIG. 3 shows a planar state of the liquid crystal which is caused by application of high-voltage pulses to the liquid crystal, and FIG. 4 shows a focal-conic state of the liquid crystal which is caused by application of low-voltage pulses to the liquid crystal. This liquid crystal display is substantially identical to the liquid crystal display of the first embodiment shown by FIGS. 1 and 2, except not having polymer nodules in the display areas. In FIGS. 3 and 4, the parts and members which basically have the same structures and the same functions as those of the first embodiment are provided with the same reference numerals in FIGS. 1 and 2.

Third Embodiment

A third embodiment of the present invention is a liquid crystal display which is basically identical to the first embodiment shown by FIGS. 1 and 2. In the third embodiment, the polymer nodules 20 are formed by a screen printing method.

Formation of the polymer nodules 20 by a screen printing method is described. A screen with a specified pattern is covered on the surface of at least one substrate with electrodes formed thereon, and a printing material (a composition for the polymer nodules, for example, photosetting resin) is applied on the screen. Then, a squeegee is moved at a specified angle and at a specified speed with a specified pressure applied. Thereby, the printing material is transferred onto the substrate through the pattern of the screen. Next, the transferred material is hardened and dried.

When the polymer nodules are formed by a screen printing method, not only the photosetting resin but also thermosetting resin such as epoxy resin, acrylic resin, etc. and thermoplastic resin can be used as the material. Thermoplastic resin includes polyvinyl chloride resin, polyvinylidene chloride resin, polyvinyl acetate resin, polyester methacrylate resin, polyester acrylic resin, polystyrene resin, polyamide resin, polyethylene resin, polypropylene resin, fluororesin, polyurethane resin, polyacrylonitrile resin, polyvinyl ether resin, polyvinyl pyrrolidone resin, saturated polyester resin, polycarbonate resin, chlorinated polyether resin, etc. Further, it is preferred that such a resin material is dissolved in a solvent to be used in paste.

When thermosetting resin or thermoplastic resin is used as the resin material for the polymer nodules and when spacers are provided between a pair of substrates, a liquid crystal display can be produced in the following way.

First, the resin material is applied on at least one of the substrates, and spacers are dispersed on at least one of the substrates. Then, the substrates are stacked together in such a way that the respective surfaces of the substrates on which electrodes are formed will be opposite each other. Pressure and heat are applied to the pair of substrates stuck together from both surfaces. Thereby, the resin material is melted, and thereafter, by cooling the substrates, the resin material is hardened again. Thus, a hollow cell is fabricated.

In order to form the hollow cell into a liquid crystal display, a liquid crystal composition is filled between the substrates with polymer nodules in-between by, for example, a vacuum injection method.

In each of the embodiments shown by FIGS. 1 through 4, it is possible to provide only one substrate, not two substrates, between two liquid crystal layers by forming electrodes on both sides of the single substrate. By reducing the number of substrates, the contrast of the laminate type liquid crystal display can be improved.

Fourth Embodiment; See FIGS. 5a and 5b

FIGS. 5a and 5b are cross sectional views of a liquid crystal display which is a fourth embodiment of the present invention. FIG. 5a shows a planar state of the liquid crystal which is caused by application of high-voltage pulses, and FIG. 5b shows a focal-conic state of the liquid crystal which is caused by application of low-voltage pulses.

This liquid crystal display is of a single layer structure which has only one of the three liquid crystal layers b, g and r provided in the liquid crystal display shown by FIGS. 1 and 2. The structure of the liquid crystal display shown by FIGS. 5a and 5b is substantially identical to the structure of the liquid crystal layers b, g and r, and the liquid crystal display shown by FIGS. 5a and 5b is used as a monocolor or monochromatic display. In FIGS. 5a and 5b, the parts and members which have the same structures and the same functions as those of the liquid crystal display shown by FIGS. 1 and 2 are provided with the same reference numerals.

The liquid crystal display shown by FIGS. 5a and 5b has a pair of substrates 11 and 12, at least one of which is transparent. Between the substrates 11 and 12, a liquid crystal composition 21y which is capable of selectively reflecting light of a specified wavelength at room temperature and a space keeping member 18 for keeping a space between the substrates 11 and 12 are provided.

Fifth Embodiment; See FIGS. 6a and 6b

FIGS. 6a and 6b are cross sectional views of a liquid crystal display which is a fifth embodiment of the present invention. FIG. 6a shows a planar state of the liquid crystal which is caused by application of high-voltage pulses, and FIG. 6b shows a focal-conic state of the liquid crystal which is caused by application of low-voltage pulses.

This liquid crystal display of the fifth embodiment is substantially of the same structure as the liquid crystal display shown by FIGS. 5a and 5b, except not having polymer nodules in the display area. In FIGS. 6a and 6b, the parts and members which have the same structures and the same functions as those of the liquid crystal display shown by FIGS. 5a and 5b are provided with the same reference numerals.

EXPERIMENTAL EXAMPLES

In order to evaluate the performances of liquid crystal displays according to the present invention, experiments were conducted. In the following, the experiments are described together with comparative examples. Liquid crystal compositions and reflective type liquid crystal displays according to the present invention are not limited to the examples.

In each of the following experimental examples and comparative examples, the reflectance of the liquid crystal display was evaluated by measuring the luminous reflectance (Y value) by use of a colorimeter CM-3700d (made by Minolta Co., Ltd.). The smaller the Y value in the uncolored state is, the more transparent the liquid crystal is, and accordingly the better the display of black is. The larger the Y value in the colored state is, the better the display of the color is. The contrast was calculated by dividing the Y value in the high-reflectance state (colored state) by the Y value in the low-reflectance state (uncolored state). In each of the liquid crystal displays which will be described in the following examples, when the liquid crystal display is in a planar state, the reflectance is high, and when the liquid crystal display is in a focal-conic state, the reflectance is low.

The anisotropy of dielectric constant ($\Delta\epsilon$) of a liquid crystal mixture or composition was calculated from the capacities of a liquid crystal cell with a vertical aligning layer and a liquid crystal cell with no aligning layers when these liquid crystal cells were hollow and when these liquid crystal cells were filled with the liquid crystal mixture or composition. The capacities were measured by use of an impedance analyizer 4192A (made by HP Co., Ltd.), and the measurements were carried out under the conditions of 25° C. and 1 kHz. The anisotropy of dielectric constant ($\Delta\epsilon$) of a chiral agent was calculated from the anisotropies of dielectric constant of chiral nematic liquid crystal compositions which had been obtained by adding the chiral agent to a nematic liquid crystal mixture with a known anisotropy of dielectric constant at various percentages.

Exemplary Chiral Agents

Here, the chemical formulas of chiral agents C-1, C-2 and C-3 which were used in the experiments will be described below.

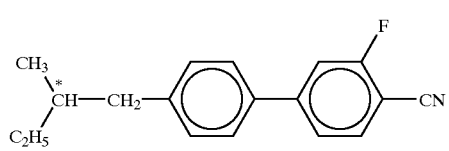

C-1

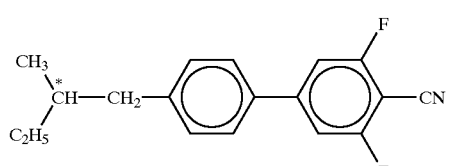

C-2

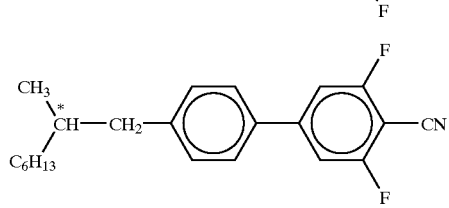

C-3

Experimental Example 1

To a nematic liquid crystal mixture A (anisotropy of refractive index $\Delta n=0.16$, anisotropy of dielectric constant $\Delta\epsilon=13.0$), the chiral agent C-1 (anisotropy of dielectric constant $\Delta\epsilon=15.6$) was added so that the chiral agent would be contained at 34 wt % of the total of the nematic liquid crystal mixture and the chiral agent. In this way, a liquid crystal composition a1 was prepared. The anisotropy of refractive index $\Delta n$ of the liquid crystal composition a1 was 0.15, and the anisotropy of dielectric constant $\Delta\epsilon$ was 13.9. The liquid crystal composition a1 was prepared so as to selectively reflect light of a wavelength range around 590 nm.

Two polycarbonate substrates, each of which has ITO transparent electrodes on its one side, were prepared. On one of the substrates, on the ITO transparent electrodes, a solution of soluble polyimide was coated by flexographic printing. Next, the substrate was sintered in an oven at a temperature of 140° C. for one hour. Thereby, a polyimide aligning layer with a thickness of 500 Å was formed on the ITO electrodes of the substrate. On the other polycarbonate substrate, on the ITO electrodes, an aligning layer was formed in the same way.

Next, on one of the substrates, a sealant XN 21 (made by Mitsui Chemicals Inc.) was screen-printed along the four sides, so that a wall with a specified height was formed. Subsequently, on the other substrate, spacers (made by Sekisui Chemical Co., Ltd.) with a diameter of 6 $\mu$m were dispersed.

Thereafter, the two substrates were laminated together and heated at a temperature of 100° C. for one hour, so that the sealant was hardened. Next, the liquid crystal composition al was filled between the substrates by a vacuum injection method, and the injection opening was closed by a sealant. In this way, a liquid crystal cell (liquid crystal display) A1 was produced. Further, on the side opposite the light incidence side, a light absorbing layer (black layer) was provided.

In the liquid crystal display, between the electrodes, a pulse voltage of 45V for 5 msec., a pulse voltage of 25V for 2 msec. and a pulse voltage of 25V for 2 msec. were applied at intervals of 2 msec. Thereby, the liquid crystal came to a transparent state (focal-conic state), and the Y value was 1.4. Also, between the electrodes, a pulse voltage of 45V for 5 msec., a pulse voltage of 45V for 2 msec and a pulse voltage of 45V for 2 msec. were applied at intervals of 2 msec. Thereby, the liquid crystal came to a colored state (planar state), and the Y value was 27.8. The driving voltage was low. The contrast was 19.9. Both the display performance of the colored state and the display performance of black were good, and because the display performance of black was especially good, the liquid crystal display could make a display with high contrast.

Experimental Example 2

To a nematic liquid crystal mixture B (anisotropy of refractive index $\Delta n=0.17$, anisotropy of dielectric constant $\Delta\epsilon=15.7$), the chiral agent C-2 (anisotropy of dielectric constant $\Delta\epsilon=23.5$) was added so that the chiral agent would be contained at 32 wt % of the total of the nematic liquid crystal mixture and the chiral agent. In this way, a liquid crystal composition b1 was prepared. The anisotropy of refractive index of the liquid crystal composition b1 was 0.16, and the anisotropy of dielectric constant $\Delta\epsilon$ was 18.2. The liquid crystal composition b1 was prepared so as to selectively reflect light of a wavelength range around 590 nm.

Two polycarbonate substrates, each of which has ITO transparent electrodes on its one side, were prepared. On one of the substrates, on the ITO transparent electrodes, a solution of soluble polyimide was coated by flexographic printing. Next, the substrate was sintered in an oven at a temperature of 140° C. for one hour. Thereby, a polyimide aligning layer with a thickness of 500 Å was formed on the ITO electrodes of the substrate. On the other polycarbonate substrate, on the ITO electrodes, an aligning layer was formed in the same way.

Next, on one of the substrates, fixed type spacers (made by Sekisui Chemical Co., Ltd.) with a diameter of 6 $\mu$m were dispersed, and the substrate was dried, so that the spacers were fixed. Subsequently, a sealant XN 21 (made by Mitsui Chemicals Inc.) was screen-printed along the four sides and was hardened, so that a wall with a specified height was formed.

Thereafter, the liquid crystal composition b1 was coated on the substrate to an amount which had been calculated from the height of the wall and the area enclosed by the wall, and the other substrate was put on this substrate. These substrates were laminated by use of a heat roller and were heated at 80° C. for two hours. In this way, a liquid crystal cell (liquid crystal display) B1 was produced. Further, on the side opposite the light incidence side, a light absorbing layer (black layer) was provided.

In this liquid crystal display, between the electrodes, a pulse voltage of 40V for 5 msec., a pulse voltage of 18V for 2 msec. and a pulse voltage of 22V for 2 msec. were applied at intervals of 2 msec. Thereby, the liquid crystal came to a transparent state (focal-conic state), and the Y value was 1.5. Also, between the electrodes, a pulse voltage of 40V for 5 msec., a pulse voltage of 40V for 2 msec. and a pulse voltage 40V for 2 msec. were applied at intervals of 2 msec. Thereby, the liquid crystal came to a colored state (planar state), and the Y value was 29.5. The driving voltage was low. The contrast was 19.7. Both the display performance of the colored state and the display performance of black were good, and because the display performance of black was especially good, the liquid crystal display could make a display with high contrast.

Experimental Example 3

To a nematic liquid crystal mixture C (anisotropy of refractive index $\Delta n=0.19$, anisotropy of dielectric constant $\Delta\epsilon=23.5$), the chiral agent C-2 (anisotropy of dielectric constant $\Delta\epsilon=23.5$) was added so that the chiral agent would be contained at 32 wt % of the total of the nematic liquid crystal mixture and the chiral agent. In this way, a liquid crystal composition c1 was prepared. The anisotropy of refractive index of the liquid crystal composition c1 was 0.17, and the anisotropy of dielectric constant $\Delta\epsilon$ was 23.5. The liquid crystal composition c1 was prepared so as to selectively reflect light of a wavelength range around 590 nm. Further, a yellow dye (Kayaset Yellow GN made by Nippon Kayaku Co., Ltd.) was added at 0.6 wt % of the total of the nematic liquid crystal mixture and the chiral agent.

Two polyether sulfone film substrates, each of which has ITO transparent electrodes on its one side, were prepared. On one of the substrates, on the ITO transparent electrodes, a solution of an insulating material which contains an organic silicon compound which contains particles of silicon oxide was coated by flexographic printing. Thereafter, the substrate was put in an oven at a temperature of 80° C. so that the solvent would be dried, and the substrate was subjected to radiation of ultraviolet rays (3J) from a high pressure mercury lamp. Further, the substrate was sintered in an oven at a temperature of 140° C. for one hour. In this way, an insulating layer with a thickness of 1500 Å was formed.

Next, a solution of soluble polyimide was coated on the substrate, and the substrate was sintered in an oven at a temperature of 140° C. for one hour. In this way, an polyimide aligning layer with a thickness of 500 Å was formed. On the other substrate, on the ITO transparent electrodes, an insulating layer and an aligning layer were formed in the same ways.

On one of the substrates, fixed type spacers with a diameter of 6 µm (made by Sekisui Chemical Co., Ltd.) were dispersed, and the substrate was dried, so that the spacers were fixed. Subsequently, a sealant XN21 (made by Mitsui Chemicals Inc.) was screen printed along the four sides of the substrate and hardened, so that a wall with a specified height was formed.

Thereafter, on the other substrate, epoxy resin was screen printed so that resin pillars with a height of 7 µm would be formed, and the substrate with the resin pillars was dried.

Thereafter, the liquid crystal composition c1 was coated on the substrate with the sealant to an amount which had been calculated by the height of the sealant and the area enclosed by the sealant. Then, the both substrates were stacked and laminated together by use of a heat roller and were sintered at a temperature of 80° C. for two hours. In this way, a liquid crystal cell (liquid crystal display) C1 was produced. Further, on the side opposite the light incidence side, a light absorbing layer (black layer) was provided.

Between the electrodes of this liquid crystal display, a pulse voltage of 38V for 5 msec., a pulse voltage of 17V for 2 msec. and a pulse voltage of 17V for 2 msec. were applied at intervals of 2 msec. Thereby, the liquid crystal came to a transparent state (focal-conic state), and the Y value was 1.5. Also, a pulse voltage of 38V for 5 msec., a pulse voltage of 38V for 2 msec. and a pulse voltage of 38V for 2 msec. were applied at intervals of 2 msec. Thereby, the liquid crystal came to a colored state (planar state), and the Y value was 28.9. The driving voltage was low. The contrast was 19.3. Both the display performance of the colored state and the display performance of black were good, and because the display performance of black was especially good, the liquid crystal display could make a display with high contrast.

Experimental Example 4

To a nematic liquid crystal mixture D (anisotropy of refractive index $\Delta n=0.18$, anisotropy of dielectric constant $\Delta\epsilon=25.1$), the chiral agent C-3 (anisotropy of dielectric constant $\Delta\epsilon=27.2$) was added so that the chiral agent would be contained at 30 wt % of the total of the nematic liquid crystal mixture and the chiral agent. In this way, a liquid crystal composition d1 was prepared. The anisotropy of refractive index of the liquid crystal composition d1 was 0.17, and the anisotropy of dielectric constant $\Delta\epsilon$ was 25.7. The liquid crystal composition d1 was prepared so as to selectively reflect light of a wavelength range around 590 nm.

Two polyether sulfone film substrates, each of which has ITO transparent electrodes on its one side, were prepared. On one of the substrates, on the ITO transparent electrodes, a solution of soluble polyimide was coated by flexographic printing. Thereafter, the substrate was put in an oven at a temperature of 140° C. for one hour. In this way, a polyimide aligning layer with a thickness of 500 Å was formed. On the other substrate, on the ITO transparent substrates, an aligning layer was formed in the same way.

Next, on one of the substrates, a sealant XN21 (made by Mitsui Chemicals Inc.) was screen-printed along the four sides and was hardened, so that a wall with a specified height was formed.

The other substrate was subjected to a weak rubbing treatment. The rubbing treatment was carried out in the following conditions: a roller wound with a rubbing cloth of rayon was rotated at a rate of 50 rpm; the relative moving speed of the rubbing roller to the plastic substrate with the aligning layer formed thereon was 140 cm/min.; and the pile push-in amount of the rubbing cloth was 0.3 mm (rubbing density was approximately 17).

Subsequently, on the substrate which had been subjected to the rubbing treatment, fixed type spacers with a diameter of 6 µm (made by Sekisui Chemical Co., Ltd.) were dispersed, and the spacers were dried.

Thereafter, the liquid crystal composition d1 was coated on the substrate with the sealant to an amount which had been calculated from the height of the sealant and the area enclosed by the sealant, and the other substrate was put on this substrate. The two substrates were laminated by use of a heat roller, and the laminate was heated at a temperature of 80° C. for two hours. In this way, a liquid crystal cell (liquid crystal display) D1 was produced. Further, on the reverse side of the substrate with the aligning layer which had been subjected to the rubbing treatment, a light absorbing layer (black layer) was provided.

Between the electrodes of the liquid crystal display, a pulse voltage of 35V for 5 msec., a pulse voltage of 15V for 2 msec. and a pulse voltage of 15V for 2 msec. were applied at intervals of 2 msec. Thereby, the liquid crystal came to a transparent state (focal-conic state), and the Y value was 1.6. Also, a pulse voltage of 35V for 5 msec., a pulse voltage of 35V for 2 msec. and a pulse voltage of 35V for 2 msec were applied at intervals of 2 msec. Thereby, the liquid crystal came to a colored state (planar state), and the Y value was 33.2. The driving voltage was low. The contrast was 20.8. Both the display performance of the colored state and the display performance of black were good, and because the display performance of black was especially good, the liquid crystal display could make a display with high contrast.

Experimental Example 5

To a nematic liquid crystal mixture E (anisotropy of refractive index $\Delta n=0.20$, anisotropy of dielectric constant $\Delta \epsilon=28.3$), the chiral agent C-3 (anisotropy of dielectric constant $\Delta \epsilon=27.2$) was added so that the chiral agent would be contained at 34 wt % of the total of the nematic liquid crystal mixture and the chiral agent. In this way, a liquid crystal composition e1 was prepared. The anisotropy of refractive index $\Delta n$ of the liquid crystal composition e1 was 0.18, and the anisotropy of dielectric constant $\Delta \epsilon$ was 26.1. The liquid crystal composition e1 was prepared so as to selectively reflect light of a wavelength range around 480 nm.

Two polyether sulfone film substrates, each of which has ITO transparent electrodes on its one side, were prepared. On one of the substrates, on the ITO transparent electrodes, a solution of an insulating material which contains an organic silicon compound which contains particles of titanium oxide was coated by flexographic printing. Thereafter, the substrate was put in an oven at a temperature of 80° C. so that the solvent would be dried, and the substrate was subjected to radiation of ultraviolet rays (3J) from a high pressure mercury lamp. Further, the substrate was sintered in an oven at a temperature of 140° C. for one hour. In this way, an insulating layer with a thickness of 200 nm was formed.

Next, a solution of soluble polyimide was coated on the substrate, and the substrate was sintered in an oven at a temperature of 140° C. for 60 minutes. In this way, an polyimide aligning layer with a thickness of 500 Å was formed. On the other substrate, on the ITO transparent electrodes, an insulating layer and an aligning layer were formed in the same ways.

On one of the substrates, a sealant XN21 (made by Mitsui Chemicals Inc.) was screen-printed along the four sides and was hardened, so that a wall with a specified height was formed.

Next, the other substrate was subjected to a weak rubbing treatment. The rubbing treatment was carried out in the following conditions: a roller wound with a rubbing cloth of rayon was rotated at a rate of 70 rpm; the relative moving speed of the rubbing roller to the plastic substrate with the aligning layer formed thereon was 180 cm/min.; and the pile push-in amount of the rubbing cloth was 0.2 mm (rubbing density was approximately 19).

Subsequently, on the substrate which had been subjected to the rubbing treatment, fixed type spacers with a diameter of 6 μm (made by Sekisui Chemical Co., Ltd.) were dispersed.

Thereafter, the liquid crystal composition e1 was coated on the substrate with the sealant to an amount which had been calculated from the height of the sealant and the area enclosed by the sealant, and the other substrate was put on this substrate. The two substrates were laminated together by use of a heat roller, and the laminate was heated at a temperature of 80° C. for two hours. In this way, a liquid crystal cell (liquid crystal display) E1 was produced. Further, on the reverse side of the substrate with the aligning layer which had been subjected to the rubbing treatment, a light absorbing layer (black layer) was provided.

Between the electrodes of the liquid crystal display, a pulse voltage of 30V for 5 msec., a pulse voltage of 13V for 2 msec. and a pulse voltage of 13V for 2 msec. were applied at intervals of 2 msec. Thereby, the liquid crystal came to a transparent state (focal-conic state), and the Y value was 1.5. Also, a pulse voltage of 30V for 5 msec., a pulse voltage of 30V for 2 msec. and a pulse voltage of 30V for 2 msec. were applied at intervals of 2 msec. Thereby, the liquid crystal came to a colored state (planar state), and the Y value was 30.5. The driving voltage was low. The contrast was 20.3. Both the display performance of the colored state and the display performance of black were good, and because the display performance of black was especially good, the liquid crystal display could make a display with high contrast.

Experimental Example 6

To a nematic liquid crystal mixture F (anisotropy of refractive index $\Delta n=0.21$, anisotropy of dielectric constant $\Delta \epsilon=22.5$), the chiral agent C-2 (anisotropy of dielectric constant $\Delta \epsilon=23.5$) was added so that the chiral agent would be contained at 29 wt % of the total of the nematic liquid crystal mixture and the chiral agent. In this way, a liquid crystal composition f1 was prepared. Next, to the nematic liquid crystal mixture F, the chiral agent C-2 was added so that the chiral agent would be contained at 32 wt % of the total of the nematic liquid crystal mixture and the chiral agent. In this way, a liquid crystal composition f2 was prepared. Further, to the nematic liquid crystal mixture F, the chiral agent C-2 was added so that the chiral agent would be contained at 35 wt % of the total of the nematic liquid crystal mixture and the chiral agent. In this way, a liquid crystal composition f3 was prepared. With respect to the liquid crystal composition f1, the anisotropy of refractive index $\Delta n$ was 0.18, and the anisotropy of dielectric constant $\Delta \epsilon$ was 22.5. The liquid crystal composition f1 was prepared so as to selectively reflect light of a wavelength range around 680 nm. With respect to the liquid crystal composition f2, the anisotropy of refractive index $\Delta n$ was 0.17, and the anisotropy of dielectric constant $\Delta \epsilon$ was 22.8. The liquid crystal composition f2 was prepared so as to selectively reflect light of a wavelength range around 560 nm. With respect to the liquid crystal composition f3, the anisotropy of refractive index $\Delta n$ was 0.17, and the anisotropy of dielectric constant $\Delta \epsilon$ was 22.9. The liquid crystal composition f3 was prepared so as to selectively reflect light of a wavelength range around 480 nm.

Two polycarbonate film substrates, each of which has ITO transparent electrodes on one side, were prepared. On one of the substrates, on the ITO transparent electrodes, a solution of soluble polyimide was coated by flexographic printing. Thereafter, the substrate was sintered in an oven at a temperature of 140° C. for one hour. In this way, a polyimide aligning layer with a thickness of 500 Å was formed. On the other substrate, on the ITO transparent electrodes, an aligning layer was formed in the same way.

Next, on one of the substrates, a sealant XN21 (made by Mitsui Chemicals Inc.) was screen-printed along the four sides, so that a wall with a specified height was formed. On the other substrate, spacers with a diameter of 9 $\mu$m (made by Sekisui Chemical Co., Ltd.) were dispersed.

Then, the substrates were laminated together, and the laminate was heated at 100° C. for one hour, so that the sealant was hardened. Thereafter, the liquid crystal composition f1 was filled between the substrates by a vacuum injection method through an opening, and the opening was closed by a sealant. In this way, a liquid crystal cell (liquid crystal display) F1 was produced.

Two polycarbonate film substrates, each of which has ITO transparent electrodes on one side, were prepared. On each of the substrates, on the ITO transparent electrodes, a polyimide aligning layer was formed in the above-described way. Next, on one of the substrates, a sealant XN21 (made by Mitsui Chemicals Inc.) was screen-printed along the four sides, so that a wall with a specified height was formed. On the other substrate, fixed type spacers with a diameter of 6 $\mu$m (made by Sekisui Chemical Co., Ltd.) were dispersed.

Then, the substrates were laminated together, and the laminate was heated at 100° C. for one hour, so that the sealant was hardened. Thereafter, the liquid crystal composition f2 was filled between the substrates by a vacuum injection method through an opening, and the opening was closed by a sealant. In this way, a liquid crystal cell (liquid crystal display) F2 was produced.

Two polycarbonate film substrates, each of which has ITO transparent electrodes on one side, were prepared. On each of the substrates, on the ITO transparent electrodes, a polyimide aligning layer was formed in the above-described way. Next, on one of the substrates, a sealant XN21 (made by Mitsui Chemicals Inc.) was screen-printed along the four sides, so that a wall with a specified height was formed. On the other substrate, fixed type spacers with a diameter of 6 $\mu$m (made by Sekisui Chemical Co., Ltd.) were dispersed.

Then, the substrates were laminated together, and the laminate was heated at 100° C. for one hour, so that the sealant was hardened. Thereafter, the liquid crystal composition f3 was filled between the substrates by a vacuum injection method through an opening, and the opening was closed by a sealant. In this way, a liquid crystal cell (liquid crystal display) F3 was produced.

These three liquid crystal cells F1, F2 and F3 were built up in this order, and on the reverse side of this laminate (on the side opposite the light incidence side, that is, on the reverse side of the liquid crystal cell F1), a light absorbing layer (black layer) was provided.

In this liquid crystal display, with respect to the liquid crystal cell F1, when a pulse voltage of 45V for 5 msec. a pulse voltage of 25V for 2 msec. and a pulse voltage of 25V for 2 msec. were applied between the electrodes at intervals of 2 msec, the liquid crystal came to a transparent state (focal-conic state). Also, when a pulse voltage of 45V for 5 msec., a pulse voltage of 45V for 2 msec. and a pulse voltage of 50V for 2 msec. were applied at intervals of 2 msec., the liquid crystal came to a colored state (planar state). With respect to the liquid crystal cells F2 and F3, when a pulse voltage of 35V for 5 msec., a pulse voltage of 20V for 2 msec. and a pulse voltage of 20V for 2 msec. were applied between the electrodes at intervals of 2 msec., the liquid crystal came to a transparent state (focal-conic state). Also, when a pulse voltage of 35V for 5 msec., a pulse voltage of 35V for 2 msec. and a pulse voltage of 35V for 2 msec. were applied at intervals of 2 msec., the liquid crystal came to a colored state (planar state). When the liquid crystal in all the liquid crystal cells came to a transparent state (focal-conic state), the Y value was 1.7. When the liquid crystal in all the liquid crystal cells came to a colored state (planar state, that is, display of white), the Y value was 31.5. The driving voltage was low. The contrast was 18.5. Both the display performance of white and the display performance of black were good, and because the display performance of white was especially good, the liquid crystal display could make a display with high contrast.

Comparative Example 1

To the nematic liquid crystal mixture A, which had been used in the experimental example 1, a chiral agent S-811 (anisotropy of dielectric constant $\Delta\epsilon=-1.0$) was added so that the chiral agent would be contained at 28 wt % of the total of the nematic liquid crystal mixture and the chiral agent. In this way, a liquid crystal composition g1 was prepared. The anisotropy of refractive index $\Delta n$ of the liquid crystal composition g1 was 0.15, and the anisotropy of dielectric constant $\Delta\epsilon$ was 9.1. The liquid crystal composition g1 was prepared so as to selectively reflect light of a wavelength range around 590 nm.

Two polycarbonate film substrates, each of which has ITO transparent electrodes on one side, were prepared. On one of the substrates, on the ITO transparent electrodes, a solution of soluble polyimide was coated by flexographic printing. Next, the substrate was sintered in an oven at a temperature of 140° C. for one hour. In this way, a polyimide aligning layer with a thickness of 500 Å was formed. On the other substrate, an aligning layer was formed in the same way.

Next, on one of the substrates, a sealant XN21 (made by Mitsui Chemicals Inc.) was screen-printed along the four sides, so that a wall with a specified thickness was formed. On the other substrate, spacers with a diameter of 6 $\mu$m (made by Sekisui Chemical Co., Ltd.) were dispersed.

Thereafter, the two substrates were laminated together, and the laminate was heated at 100° C. for one hour, so that the sealant was hardened. Then, the liquid crystal composition g1 was filled between the substrates through an opening by a vacuum injected method, and the opening was closed by a sealant. In this way, a liquid crystal cell (liquid crystal display) G1 was produced. Further, on the side opposite the light incidence side, a light absorbing layer (black layer) was provided.

In the liquid crystal display, between the electrodes, a pulse voltage of 70V for 5 msec., a pulse voltage of 40V for 2 msec. and a pulse voltage of 40V for 2 msec. were applied at intervals of 2 msec. Thereby, the liquid crystal came to a transparent state (focal-conic state), and the Y value was 1.5. Also, a pulse voltage of 70V for 5 msec., a pulse voltage of 70V for 2 msec. and a pulse voltage of 70V for 2 msec. were applied at intervals of 2 msec. Thereby, the liquid crystal came to a colored state (planar state), and the Y value was 26.0. The contrast was 17.3. Thus, the liquid crystal display needed a high driving voltage and made a display with low contrast.

Comparative Example 2

To the nematic liquid crystal mixture A, which had been used in the experimental example 1, a chiral agent CB-15

(anisotropy of dielectric constant Δε=10.0) was added so that the chiral agent would be contained at 36 wt % of the total of the nematic liquid crystal mixture and the chiral agent. In this way, a liquid crystal composition h1 was prepared. The anisotropy of refractive index Δn of the liquid crystal composition h1 was 0.15, and the anisotropy of dielectric constant Δε was 11.9. The liquid crystal composition h1 was prepared so as to selectively reflect light of a wavelength range around 590 nm.

Two polycarbonate film substrates, each of which has ITO transparent electrodes on one side, were prepared. On one of the substrates, on the ITO transparent electrodes, a solution of soluble polyimide was coated by flexographic printing. Next, the substrate was sintered in an oven at a temperature of 140° C. for one hour. In this way, a polyimide aligning layer with a thickness of 500 Å was formed. On the other substrate, an aligning layer was formed in the same way.

Next, on one of the substrates, a sealant XN21 (made by Mitsui Chemicals Inc.) was screen-printed along the four sides, so that a wall with a specified thickness was formed. On the other substrate, spacers with a diameter of 6 μm (made by Sekisui Chemical Co., Ltd.) were dispersed.

Thereafter, the two substrates were laminated together, and the laminate was heated at 100° C. for one hour, so that the sealant was hardened. Then, the liquid crystal composition hi was filled between the substrates through an opening by a vacuum injection method, and the opening was closed by a sealant. In this way, a liquid crystal cell (liquid crystal display) H1 was produced. Further, on the side opposite the light incidence side, a light absorbing layer (black layer) was provided.

In the liquid crystal display, between the electrodes, a pulse voltage of 55V for 5 msec., a pulse voltage of 30V for 2 msec. and a pulse voltage of 30V for 2 msec. were applied at intervals of 2 msec. Thereby, the liquid crystal came to a transparent state (focal-conic state), and the Y value was 1.5. Also, a pulse voltage of 55V for 5 msec., a pulse voltage of 55V for 2 msec. and a pulse voltage of 55V for 2 msec. were applied at intervals of 2 msec. Thereby, the liquid crystal came to a colored state (planar state), and the Y value was 26.5. The contrast was 17.7. Thus, the liquid crystal display needed a high driving voltage and made a display with low contrast.

Other Embodiments

The liquid crystal cells may be of a network type in which a liquid crystal composition and polymeric resin form a net of a composite film. Also, the polymer nodules may be of a short type which reaches only the middle of the space between the substrates.

Although the present invention has been described with reference to the preferred embodiments above, it is to be noted that various changes and modifications are possible to those who are skilled in the art. Such changes and modifications are to be understood as being within the scope of the present invention.

What is claimed is:

1. A chiral nematic liquid crystal composition which contains a nematic liquid crystal mixture and a chiral agent, which exhibits a cholesteric phase at room temperature and which selectively reflects light of a specified wavelength, wherein an anisotropy of dielectric constant of the chiral nematic liquid crystal composition is larger than that of the nematic liquid crystal mixture before being mixed with the chiral agent.

2. A chiral nematic liquid crystal composition according to claim 1, wherein the anisotropy of dielectric constant of the nematic liquid crystal mixture is not less than 10.

3. A chiral nematic liquid crystal composition according to claim 1, wherein the anisotropy of dielectric constant of the nematic liquid crystal mixture is not less than 20.

4. A chiral nematic liquid crystal composition according to claim 1, wherein the chiral nematic liquid crystal composition contains the chiral agent at a percentage within a range from 8 wt % to 45 wt %.

5. A chiral nematic liquid crystal composition according to claim 1, wherein the chiral nematic liquid crystal composition has the anisotropy of dielectric constant within a range from 8 to 45.

6. A chiral nematic liquid crystal composition according to claim 1, wherein the chiral nematic liquid crystal composition contains two or more kinds of chiral agents.

7. A chiral nematic liquid crystal composition according to claim 1, wherein the chiral nematic liquid crystal composition further contains a dye.

8. A chiral nematic liquid crystal composition which contains a nematic liquid crystal mixture and a chiral agent, which exhibits a cholesteric phase at room temperature and which selectively reflects light of a specified wavelength, wherein the chiral agent has an anisotropy of dielectric constant within a range from 12 to 60.

9. A chiral nematic liquid crystal composition according to claim 8, wherein the chiral agent has the anisotropy of dielectric constant within a range from 15 to 60.

10. A chiral nematic liquid crystal composition according to claim 8, wherein the anisotropy of dielectric constant of the nematic liquid crystal mixture is not less than 20.

11. A chiral nematic liquid crystal composition according to claim 8, wherein the chiral nematic liquid crystal composition contains the chiral agent at a percentage within a range from 8 wt % to 45 wt %.

12. A chiral nematic liquid crystal composition according to claim 8, wherein the chiral nematic liquid crystal composition has an anisotropy of dielectric constant within a range from 8 to 45.

13. A chiral nematic liquid crystal composition according to claim 8, wherein the chiral nematic liquid crystal composition contains two or more kinds of chiral agents.

14. A chiral nematic liquid crystal composition according to claim 8, wherein the chiral nematic liquid crystal composition further contains a dye.

15. A chiral nematic liquid crystal composition which contains a nematic liquid crystal mixture and a chiral agent, which exhibits a cholesteric phase at room temperature and which selectively reflects light of a specified wavelength, wherein the chiral agent has an anisotropy of dielectric constant which is larger than that of the nematic liquid crystal mixture.

16. A chiral nematic liquid crystal composition according to claim 15, wherein the anisotropy of dielectric constant of the nematic liquid crystal mixture is not less than 20.

17. A chiral nematic liquid crystal composition according to claim 15, wherein the chiral nematic liquid crystal composition contains the chiral agent at a percentage within a range from 8 wt % to 45 wt %.

18. A chiral nematic liquid crystal composition according to claim 15, wherein the chiral nematic liquid crystal composition has an anisotropy of dielectric constant within a range from 8 to 45.

19. A chiral nematic liquid crystal composition according to claim 15, wherein the chiral nematic liquid crystal composition contains two or more kinds of chiral agents.

20. A chiral nematic liquid crystal composition according to claim 15, wherein the chiral nematic liquid crystal composition further contains a dye.

21. A reflective type liquid crystal display which has, between a pair of substrates, at least one of which is transparent, a liquid crystal composition which contains a liquid crystal mixture and a chiral agent, which exhibits a cholesteric phase at room temperature and which selectively reflects light of a specified wavelength, wherein an anisotropy of dielectric constant of the chiral nematic liquid crystal composition is larger than that of the nematic liquid crystal mixture before being mixed with the chiral agent.

22. A reflective type liquid crystal display according to claim 21, wherein the anisotropy of dielectric constant of the nematic liquid crystal mixture is not less than 10.

23. A reflective type liquid crystal display according to claim 21, wherein the chiral nematic liquid crystal composition has the anisotropy of dielectric constant within a range from 8 to 45.

24. A reflective type liquid crystal display according to claim 21, wherein at least one of the substrates is a resin substrate.

25. A reflective type liquid crystal display according to claim 21, wherein the chiral nematic liquid crystal composition contains two or more kinds of chiral agents.

26. A reflective type liquid crystal display according to claim 21, wherein the chiral nematic liquid crystal composition further contains a dye.

27. A reflective type liquid crystal display according to claim 21, wherein the chiral nematic liquid crystal composition provided between the substrates is a layer with a thickness within a range from 3 nm to 10 nm.

28. A reflective type liquid crystal display according to claim 21, wherein between the substrates, spacers which are inorganic particles coated with adhesive resin are further provided.

29. A reflective type liquid crystal display according to claim 21, wherein between the substrates, a plurality of polymer nodules are further provided.

30. A reflective type liquid crystal display according to claim 21, further comprising a color filter.

31. A laminate type liquid crystal display which comprises a plurality of liquid crystal layers, each of which is sandwiched between a pair of substrates, the liquid crystal layers being stacked one upon another, wherein each of the liquid crystal layers and the substrates sandwiching the liquid crystal layer are structured into a reflective type liquid crystal display according to claim 21.

32. A reflective type liquid crystal display which has, between a pair of substrates, at least one of which is transparent, a liquid crystal composition which contains a liquid crystal mixture and a chiral agent, which exhibits a cholesteric phase at room temperature and which selectively reflects light of a specified wavelength, wherein the chiral agent contained in the chiral nematic liquid crystal composition has an anisotropy of dielectric constant within a range from 12 to 60.

33. A reflective type liquid crystal display according to claim 32, wherein the chiral nematic agent has the anisotropy of dielectric constant within a range from 15 to 60.

34. A reflective type liquid crystal display according to claim 32, wherein the chiral nematic liquid crystal composition has an anisotropy of dielectric constant within a range from 8 to 45.

35. A reflective type liquid crystal display according to claim 32, wherein at least one of the substrates is a resin substrate.

36. A reflective type liquid crystal display according to claim 32, wherein the chiral nematic liquid crystal composition contains two or more kinds of chiral agents.

37. A reflective type liquid crystal display according to claim 32, wherein the chiral nematic liquid crystal composition further contains a dye.

38. A reflective type liquid crystal display according to claim 32, wherein the chiral nematic liquid crystal composition provided between the substrates is a layer with a thickness within a range from 3 nm to 10 nm.

39. A reflective type liquid crystal display according to claim 32, wherein between the substrates, spacers which are inorganic particles coated with adhesive resin are further provided.

40. A reflective type liquid crystal display according to claim 32, wherein between the substrates, a plurality of polymer nodules are further provided.

41. A reflective type liquid crystal display according to claim 32, further comprising a color filter.

42. A laminate type liquid crystal display which comprises a plurality of liquid crystal layers, each of which is sandwiched between a pair of substrates, the liquid crystal layers being stacked one upon another, wherein each of the liquid crystal layers and the substrates sandwiching the liquid crystal layer are structured into a reflective type liquid crystal display according to claim 32.

43. A reflective type liquid crystal display which has, between a pair of substrates, at least one of which is transparent, a liquid crystal composition which contains a liquid crystal mixture and a chiral agent, which exhibits a cholesteric phase at room temperature and which selectively reflects light of a specified wavelength, wherein the chiral agent contained in the chiral nematic liquid crystal composition has an anisotropy of dielectric constant which is larger than that of the nematic liquid crystal mixture.

44. A reflective type liquid crystal display according to claim 43, wherein the chiral nematic liquid crystal composition has an anisotropy of dielectric constant within a range from 8 to 45.

45. A reflective type liquid crystal display according to claim 43, wherein at least one of the substrates is a resin substrate.

46. A reflective type liquid crystal display according to claim 43, wherein the chiral nematic liquid crystal composition contains two or more kinds of chiral agents.

47. A reflective type liquid crystal display according to claim 43, wherein the chiral nematic liquid crystal composition further contains a dye.

48. A reflective type liquid crystal display according to claim 43, wherein the chiral nematic liquid crystal composition provided between the substrates is a layer with a thickness within a range from 3 nm to 10 nm.

49. A reflective type liquid crystal display according to claim 43, wherein between the substrates, spacers which are inorganic particles coated with adhesive resin are further provided.

50. A reflective type liquid crystal display according to claim 43, wherein between the substrates, a plurality of polymer nodules are further provided.

51. A reflective type liquid crystal display according to claim 43, further comprising a color filter.

52. A laminate type liquid crystal display which comprises a plurality of liquid crystal layers, each of which is sandwiched between a pair of substrates, the liquid crystal layers being stacked one upon another, wherein each of the liquid crystal layers and the substrates sandwiching the liquid crystal layer are structured into a reflective type liquid crystal display according to claim 43.

\* \* \* \* \*